United States Patent
Koo

(10) Patent No.: US 9,552,364 B2
(45) Date of Patent: Jan. 24, 2017

(54) PORTABLE CONTENT PLAYER, CONTENT STORAGE DEVICE, AND METHOD OF SYNCHRONIZING CONTENT STATE LISTS BETWEEN PORTABLE CONTENT PLAYER AND CONTENT STORAGE DEVICE

(71) Applicant: SAMSUNG ELECTRONICS CO., LTD., Suwon-si, Gyeonggi-do (KR)

(72) Inventor: Min-soo Koo, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/084,169

(22) Filed: Nov. 19, 2013

(65) Prior Publication Data

US 2014/0074779 A1 Mar. 13, 2014

Related U.S. Application Data

(63) Continuation of application No. 11/742,849, filed on May 1, 2007, now Pat. No. 9,195,676.

(30) Foreign Application Priority Data

Nov. 3, 2006 (KR) ........................ 10-2006-0108393

(51) Int. Cl.
  *G06F 17/30* (2006.01)
  *G06F 7/00* (2006.01)
  *G11B 27/10* (2006.01)
(52) U.S. Cl.
  CPC ... *G06F 17/30174* (2013.01); *G06F 17/30017* (2013.01); *G11B 27/10* (2013.01)
(58) Field of Classification Search
  CPC ................. G06F 17/30017; G06F 17/30575; G06F 17/30581; G06F 17/30174; G06F 12/0859; G06F 13/18; G11B 27/10
  (Continued)

(56) References Cited

U.S. PATENT DOCUMENTS 5,966,714 A 10/1999 Huang et al.
6,324,544 B1 11/2001 Alam et al.
(Continued)

FOREIGN PATENT DOCUMENTS

JP 2002-344861 11/2002
KR 10-2006-0012555 2/2006
KR 2006-45149 5/2006

OTHER PUBLICATIONS

Korean Office Action issued Feb. 11, 2011 in corresponding Korean Patent Application 10-2006-0108393.
(Continued)

*Primary Examiner* — Greta Robinson
(74) *Attorney, Agent, or Firm* — Staas & Halsey LLP

(57) ABSTRACT

A portable content player, a content storage device, and a method of synchronizing content between the portable content player and the content storage device, the method including: generating a first content state list for content stored in the content storage device and a second content state list for content stored in the portable content player; generating an execution list based on the first content state list and the second content state list; and matching the first content state list with the second content state list by executing a synchronization command included in the execution list on content selected to be synchronized. Accordingly, a user can automatically match the content state lists of the portable content player and the content storage device.

16 Claims, 8 Drawing Sheets

(58) Field of Classification Search
USPC ............... 707/609–614, 617–618,
620–621,707/624–625, 640, 674, 679,
695, 9; 709/201, 709/242; 717/140, 151
See application file for complete search history.

(56) References Cited

U.S. PATENT DOCUMENTS

| | | | |
|---|---|---|---|
| 6,463,427 B1 | 10/2002 | Wu | |
| 6,718,361 B1 | 4/2004 | Basani et al. | |
| 6,856,999 B2 | 2/2005 | Flanagin et al. | |
| 7,272,859 B2 | 9/2007 | Kuriya et al. | |
| 7,472,129 B2 | 12/2008 | Adya et al. | |
| 7,669,219 B2 | 2/2010 | Scott, III | |
| 7,899,781 B1 | 3/2011 | Pittman et al. | |
| 8,065,680 B2 | 11/2011 | Parvathaneni et al. | |
| 8,180,731 B2 * | 5/2012 | Konno et al. | 707/621 |
| 2002/0035599 A1 | 3/2002 | Matsumoto et al. | |
| 2005/0262166 A1 * | 11/2005 | Rajeev | G06F 17/30581 |
| 2006/0015540 A1 * | 1/2006 | Takeda et al. | 707/201 |
| 2006/0112144 A1 | 5/2006 | Ireton | |
| 2006/0155776 A1 | 7/2006 | Aust | |
| 2006/0206340 A1 | 9/2006 | Silvera et al. | |
| 2006/0224620 A1 * | 10/2006 | Silverman | G11B 27/10 |
| 2006/0227683 A1 * | 10/2006 | Itoh | 369/47.15 |
| 2007/0033225 A1 | 2/2007 | Davis | |
| 2007/0067354 A1 | 3/2007 | Mullender et al. | |
| 2007/0088764 A1 * | 4/2007 | Yoon et al. | 707/201 |
| 2007/0130217 A1 * | 6/2007 | Linyard et al. | 707/201 |
| 2007/0271309 A1 | 11/2007 | Witriol et al. | |
| 2009/0013027 A1 * | 1/2009 | Tanaka | 709/203 |
| 2009/0019240 A1 * | 1/2009 | Kawasaki | 711/154 |

OTHER PUBLICATIONS

U.S. Office Action issued Sep. 22, 2009 in copending U.S. Appl. No. 11/742,849.
U.S. Office Action issued May 13, 2010 in copending U.S. Appl. No. 11/742,849.
U.S. Office Action issued Sep. 22, 2010 in copending U.S. Appl. No. 11/742,849.
U.S. Office Action issued Mar. 10, 2011 in copending U.S. Appl.No. 11/742,849.
U.S. Office Action issued Jul. 18, 2011 in copending U.S. Appl. No. 11/742,849.
U.S. Office Action issued Jan. 26, 2012 in copending U.S. Appl. No. 11/742,849.
U.S. Office Action issued May 18, 2012 in copending U.S. Appl. No. 11/742,849.
U.S. Office Action issued Jan. 22, 2013 in copending U.S. Appl. No. 11/742,849.
U.S. Office Action issued Jun. 25, 2013 in copending U.S. Appl. No. 11/742,849.
U.S. Appl. No. 11/742,849, filed May 1, 2007, Min-soo Koo, Samsung Electronics Co., Ltd.
U.S. Office Action issued Jun. 10, 2014 in copending U.S. Appl. No. 11/742,849.
U.S. Notice of Allowance issued Jul. 13, 2015 in related U.S. Appl. No. 11/742,849.
U.S. Office Action issued Dec. 9, 2014 in copending U.S. Appl. No. 11/742,849.
Office Action issued Dec. 17, 2013 in copending U.S. Appl. No. 11/742,849.

* cited by examiner

FIG. 2A

CONTENT STORAGE DEVICE / 200

| ... | CONTENT FILE NAME | ADDITIONAL INFORMATION... | SYNCHRONIZATION STATE | TRANSMISSION STATE |
|---|---|---|---|---|
| ... | A | ... | O | O |
| ... | B | ... | O | X |
| ... | C | ... | O | △ |
| ... | D | ... | X | O |
| ... | E | ... | O | O |

O : FINISHED  △ : PROCEEDING  X : NOT PERFORMED

PORTABLE CONTENT PLAYER / 210

| ... | CONTENT FILE NAME | ADDITIONAL INFORMATION... | SYNCHRONIZATION STATE | REPRODUCTION STATE | TRANSMISSION STATE |
|---|---|---|---|---|---|
| ... | A | ... | O | △ | O |
| ... | C | ... | O | X | △ |
| ... | D | ... | O | O | O |
| ... | E | ... | O | O | O |

O : FINISHED  △ : PROCEEDING  X : NOT PERFORMED

FIG. 2B

201 CONTENT STORAGE DEVICE

| | CONTENT FILE NAME | ADDITIONAL INFORMATION... | CONFIRM & SYNCHRONIZATION | |
|---|---|---|---|---|
| | | | SYNCHRONIZATION STATE | TRANSMISSION STATE |
| ... | A | ... | O | O |
| ... | B | ... | O | O |
| ... | C | ... | O | △ |
| ... | D | ... | O | O |
| ... | E | ... | O | O |

O : FINISHED  △ : PROCEEDING  X : NOT PERFORMED

211 PORTABLE CONTENT PLAYER

| | CONTENT FILE NAME | ADDITIONAL INFORMATION... | SYNCHRONIZATION STATE | REPRODUCTION STATE | TRANSMISSION STATE |
|---|---|---|---|---|---|
| ... | A | ... | O | △ | O |
| ... | C | ... | O | X | △ |
| ... | D | ... | O | O | O |
| ... | E | ...DELETE | O | O | O |
| ... | B | ... | O | X | O |

O : FINISHED  △ : PROCEEDING  X : NOT PERFORMED

FIG. 3

| ... | CONTENT FILE NAME | ADDITIONAL INFORMATION | SYNCHRONIZATION STATE | REPRODUCTION STATE | COMMAND |
|---|---|---|---|---|---|
| ... | D | ... | O | O | UPDATE |
| ... | E | ... | O | O | DELETE |
| ... | C | ... | O | X | APPEND |
| ... | B | ... | O | X | DOWNLOAD |

PORTABLE CONTENT PLAYER, CONTENT STORAGE DEVICE, AND METHOD OF SYNCHRONIZING CONTENT STATE LISTS BETWEEN PORTABLE CONTENT PLAYER AND CONTENT STORAGE DEVICE

CROSS-REFERENCE TO RELATED APPLICATION

This application is a continuation of U.S. application Ser. No. 11/742,849 filed May 1, 2007 which claims priority from Korean Patent Application No. 2006-108393, filed on Nov. 3, 2006 in the Korean Intellectual Property Office, the disclosure of which is incorporated herein by reference.

BACKGROUND OF THE INVENTION

1. Field of the Invention

Aspects of the present invention relate to a portable content player, a content storage device, and a method of synchronizing content between a portable content player and a content storage device, and more particular, to a method and apparatus for editing a content state list of content stored in each of a portable content player and a content storage device and synchronizing the content state lists between the portable content player and the content storage device with respect to content that is selected to be synchronized.

2. Description of the Related Art

Conventionally, users directly manage all files in portable content players, such as a portable multimedia player (PMP) and a mobile phone. To manage the files, the users search for desired files from a personal computer (PC) that is a mass media storage device. Thereafter, in order to store the found files in a portable content player, the user may connect the portable content player and the PC to each other in a wired/wireless manner, execute a transmission program, and store desired multimedia files in the portable content player. As a result, in order to view a movie using the portable content player, most users must repeatedly perform the above-described procedures.

In addition, in order to continue to view multimedia data (e.g., a movie) that was interrupted during a reproduction in a content storage device (e.g., a PC), using a portable content player, the entire movie file must be downloaded from the content storage device to the portable content player, and after the interrupted point of the downloaded movie file is found, a portion subsequent to the interrupted point must be played.

SUMMARY OF THE INVENTION

Aspects of the present invention provide a method and apparatus to automatically synchronize content state lists between a content storage device and a portable content player by connecting the content storage device and the portable content player to each other.

Aspects of the present invention also provide a method and apparatus to synchronize content, whereby content interrupted during reproduction in a content storage device can be continued from the interrupted point in a portable content player.

According to an aspect of the present invention, there is provided a method of synchronizing content state lists between a portable content player and a content storage device having a content reproduction function, the method including: generating a first content state list for content stored in the content storage device and a second content state list for content stored in the portable content player; generating an execution list based on the first content state list and the second content state list; and matching the first content state list with the second content state list by executing a synchronization command included in the execution list on content selected to be synchronized.

The selected content may be selected to be synchronized by at least one of the portable content player and the content storage device, and the synchronization command included in the execution list may include at least one of an update command of the first and/or second content state list, a transmission command of a whole or a portion of the selected content, and a delete command of the selected content.

The second content state list may include a transmission state, a synchronization state, and a reproduction state for each file of the content.

The second content state list may further include information on a reproduction-interruption point of the content.

According to another aspect of the present invention, there is provided a method of synchronizing content state lists between a portable content player and a content storage device having a content reproduction function, the method including: determining whether content to be reproduced in the content storage device is transmitted; transmitting and storing the content to be reproduced to the portable content player according to the determination; if the content storage device stops reproducing the content, determining whether the content is completely reproduced; and if it is determined that the content is completely reproduced, deleting the completely reproduced content from the portable content player and updating the content state list of the portable content player.

The method may further include deleting a reproduced portion of the content and updating the content state list of the portable content player if it is determined that the content is not completely reproduced.

The determining of whether the content is transmitted may include determining whether the content to be reproduced in the content storage device is transmitted based on whether the content to be reproduced is content that is selected to be synchronized, wherein the synchronization is selected by at least one of the portable content player and the content storage device.

The content state list of the portable content player may include a transmission state, a synchronization state, and a reproduction state of each piece of content.

The content state list of the portable content player may further include information on a reproduction-interruption point of content that has not been completely reproduced.

According to another aspect of the present invention, there is provided a content storage device having a content reproduction function and performing content synchronization with a portable content player, the content storage device including: a content storage unit to store content; a content state list generator to generate and to update a first content state list with respect to the content stored in the content storage unit; an execution list generator to generate an execution list based on the first content state list and a second content state list of the portable content player; and a synchronization controller to match the first content state list with the second content state list by executing a synchronization command included in the execution list on content selected to be synchronized.

If the content is reproduced when the content storage device is connected to the portable content player, the synchronization controller may store the content to be reproduced in the portable content player, wherein the stored content is content that is selected to be synchronized.

If the content is completely reproduced, the synchronization controller may delete the completely reproduced content and update the first and second content state lists.

The content may be selected to be synchronized from at least one of the portable content player and the content storage device, and the synchronization command included in the execution list may be at least one of an update command of the first and/or second content state list, a transmission command of a whole or a portion of the selected content, and a delete command of the selected content.

The second content state list may include a transmission state, a synchronization state, and a reproduction state for each file of the content.

The second content state list may further include information on a reproduction-interruption point of content that has not been completely reproduced by the content storage device.

According to another aspect of the present invention, there is provided a portable content player capable of synchronizing content with a content storage device having a content reproduction function, the portable content player including: a content storage unit to store content; and a content state list generator to generate and to update a content state list with respect to the content stored in the content storage unit, wherein the content state list is updated by the content storage device with respect to content that is selected to be synchronized when the portable content player is connected to the content storage device.

The content may be selected to be synchronized from at least one of the portable content player and the content storage device, and the content state list may include a transmission state, a synchronization state, and a reproduction state for each file of the content.

The content state list may further include information on a reproduction-interruption point of content that has not been completely reproduced.

The portable content player may reproduce the content from the reproduction-interruption point by referring to the reproduction information.

According to another aspect of the present invention, there is provided a method of reproducing content in a first device that was partially reproduced in a second device, the method including: transmitting the partially reproduced content from the second device to the first device; determining a reproduction-interruption point in the partially reproduced content; and reproducing the content from the reproduction-interruption point.

According to another aspect of the present invention, there is provided a method of synchronizing content state lists between a first storage device and a second storage device, the method including: generating a first content state list for content stored in the first storage device and a second content state list for content stored in the second storage device; generating an execution list based on the first content state list and the second content state list; and matching the first content state list with the second content state list by executing a synchronization command included in the execution list on content selected to be synchronized.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIGS. 2A and 2B illustrate content state lists of a portable content player and a content storage device according to an embodiment of the present invention;

FIG. 3 illustrates an execution list according to an embodiment of the present invention;

DETAILED DESCRIPTION OF THE EMBODIMENTS

Figure 1:
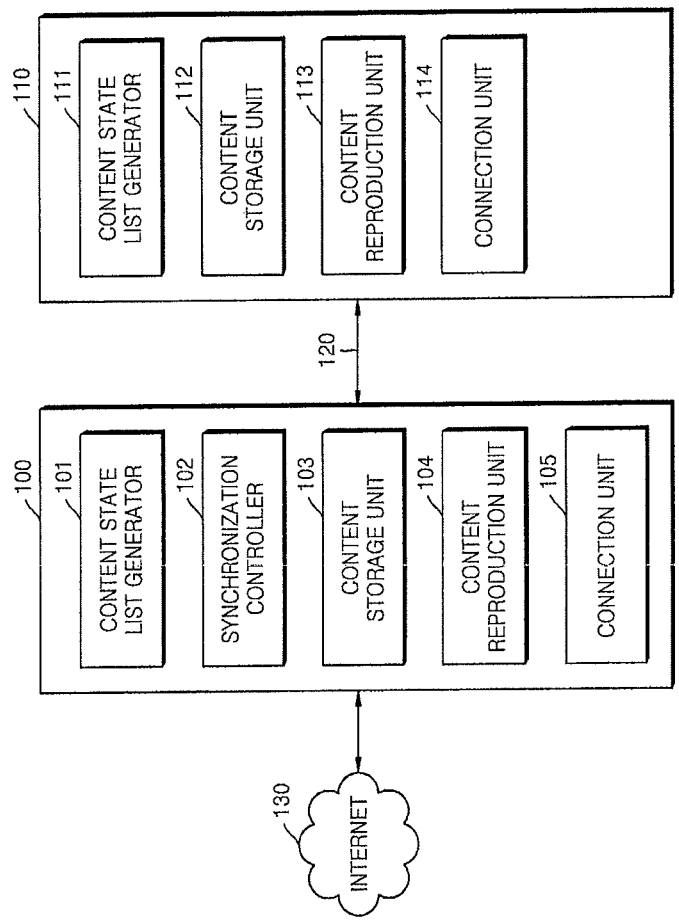
FIG. 1 is a block diagram of a portable content player and a content storage device according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

FIG. 1 is a block diagram of a content storage device 100 (such as a PC) and a portable content player 110 (such as a PMP or a mobile phone) according to an example embodiment of the present invention. Referring to FIG. 1, the content storage device 100 includes a content state list generator 101, a synchronization controller 102, a content storage unit 103, a content reproduction unit 104, and a connection unit 105. Furthermore, referring to FIG. 1, the portable content player 110 includes a content state list generator 111, a content storage unit 112, a content reproduction unit 113, and a connection unit 114. It is understood that aspects of the present invention disclosed as applying to portable content players 110 are not limited to portable content players 110, and may be applied to other content storage devices (such as home audio equipment with content storage capabilities or personal computers).

The content state list generator 101 of the content storage device 100 generates and/or updates a content state list with respect to content stored in the content storage unit 103. With respect to each piece of content, the content state list includes, but not limited thereto, a content file name, a synchronization state regarding whether synchronization is set, and a transmission state regarding whether a content file has been transmitted from the content storage device 100 to the portable content player 110. It is understood that, according to other aspects of the present invention, the content state list may also include additional information, such as a content file size, a content file type, and a reproduction-interruption point referring to a last playback interruption point.

For example, the content state list may further include a reproduction state regarding whether the stored content has been reproduced. In addition, after an operation is performed on content in the content storage device 100 (e.g., an operation such as content reproduction or reproduction stop), the content state list generator 101 updates the content state list. Reproduction information, such as the reproduction state and a reproduction-interruption point, may be included in an additional information field of the content state list.

The synchronization controller 102 synchronizes the content state list of the content storage device 100 and a content state list of the portable content player 110 with respect to content that is selected to be synchronized according to a synchronization command included in an execution list. The synchronization of the content state lists matches the content state list stored in the content storage device 100 with the content state list stored in the portable content player 110.

The content storage unit 103 stores content that may, for example, be downloaded from an external server via a network or the Internet 130. The stored content may be reproduced by the content reproduction unit 104.

The connection unit 105 is connected to the portable content player 110 via a wired/wireless connection device 120. For example, the connection unit 105 may be a Universal Serial Bus (USB) interface, an infrared interface, or a Bluetooth interface.

The content state list generator 111 of the portable content player 110 generates and/or updates a content state list with respect to content stored in the content storage unit 112. With respect to each piece of stored content, the content state list includes, but not limited thereto, a content file name, a synchronization state regarding whether synchronization is set, a transmission state regarding whether a content file has been transmitted from the content storage device 100 to the portable content player 110, and a reproduction state. Reproduction information including a reproduction-interruption point may be included in an additional information field of the content state list.

The content storage unit 112 stores content downloaded from the content storage device 100. The stored content is reproduced by the content reproduction unit 113.

The connection unit 114 is connected to the content storage device 100 via the wired/wireless connection device 120. For example, the connection unit 114 may be a USB interface, an infrared interface, or a Bluetooth interface.

FIGS. 2A and 2B illustrate content state lists 200, 201, 210, and 211 of the content storage device 100 and the portable content player 110 according to an embodiment of the present invention. FIG. 2A illustrates content state lists 200 and 210 before content is synchronized, and FIG. 2B illustrates content state lists 201 and 211 after the content is synchronized. FIG. 3 illustrates an execution list according to an embodiment of the present invention.

An additional information field of each content state list may include reproduction information, such as information on a reproduction-interruption point, a play time, a play count, Digital Rights Management (DRM), a license, and a codec of content, although not limited thereto.

Referring to FIGS. 2A, 2B, and 3, a content storage device 100 (e.g., a home PC) storing five pieces of movie content A to E and a portable content player 110 (e.g., a Portable Multimedia Player (PMP)) storing four pieces of movie content A, C, D, and E are described as an example. Furthermore, it is assumed, as an example for purposes of this disclosure, that a user has set synchronization for A, B, C, and E of the content state list 200 of the content storage device 100 and A, C, D, and E of the content state list 210 of the portable content player 110.

Referring to the content state list 210 of the portable content player 110 before synchronization is performed, illustrated in FIG. 2A, the user has received the content A but has not completely viewed the content A yet. The content C has not been completely received or reproduced. The contents D and E have been completely received and reproduced. The content state list 200 of the content storage device 100 may be understood in the same manner.

If the content storage device 100 and the portable content player 110 are connected to each other, the content storage device 100 reads the content state lists 200 and 210 of the content storage device 100 and the portable content player 110. The content storage device 100 generates the execution list illustrated in FIG. 3 based on the read content state lists 200 and 210.

Referring to FIG. 3, for the content D, it is necessary to update only a synchronization state of the content state list 200 of the content storage device 100. For the content E, since the portable content player 110 has completely reproduced the content E, it is necessary to delete the content E from the content state list 210. However, it is understood that, according to other aspects, the content E that has already been completely reproduced may just be omitted from the execution list, rather than deleted. For the content C, it is necessary to retransmit a portion, which has not been transmitted yet, to the portable content player 110. For the content B, it is necessary to transmit the entire portion of the content to the portable content player 110.

If the execution list illustrated in FIG. 3 is edited, the content storage device 100 performs synchronization sequentially according to commands included in the execution list. The sequence of synchronization can be set according to the importance of the content, an execution time of each command, the priority of commands, and/or a user's preference. Thus, after the synchronization is performed, the content state lists 201 and 211 of the content storage device 100 and the portable content player 110 match with each other as illustrated in FIG. 2B.

Figure 4:
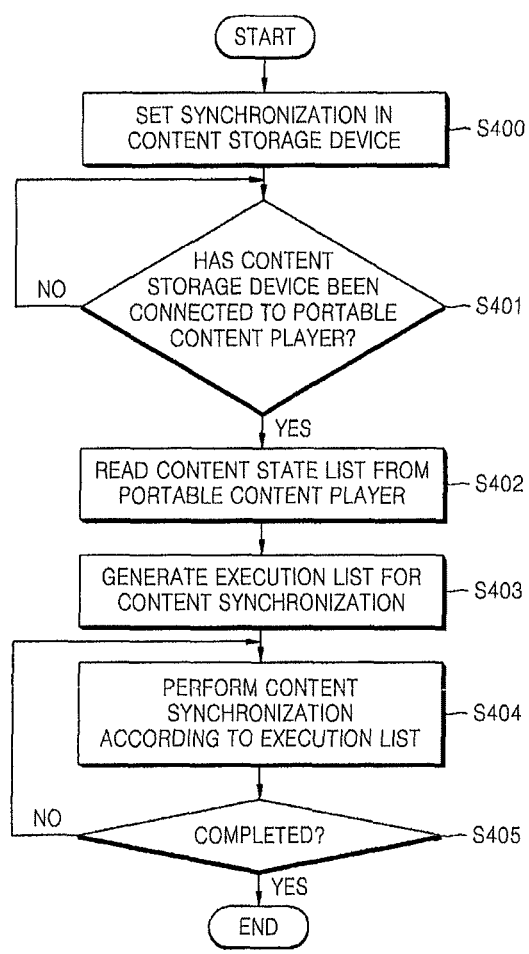
FIG. 4 is a flowchart illustrating a synchronization method of a content storage device according to an embodiment of the present invention.

FIG. 4 is a flowchart illustrating a synchronization method performed by the content storage device 100 illustrated in FIG. 1, according to an embodiment of the present invention. Referring to FIG. 4, the content storage device 100 sets or initiates synchronization in operation S400. It is understood that the synchronization can be set by the portable content player 110 instead of the content storage device 100. That is, any one of the content storage device 100 and the portable content player 110 can set the synchronization.

If the portable content player 110 is connected to the content storage device 100 in operation S401, the content storage device 100 reads a content state list from the portable content player 110 in operation S402. The content storage device 100 edits an execution list for the content synchronization in operation S403 and performs the content synchronization according to the execution list in operation S404. The content synchronization is sequentially performed in operation S405 until the content synchronization is performed for all content included in the execution list.

Figure 5:
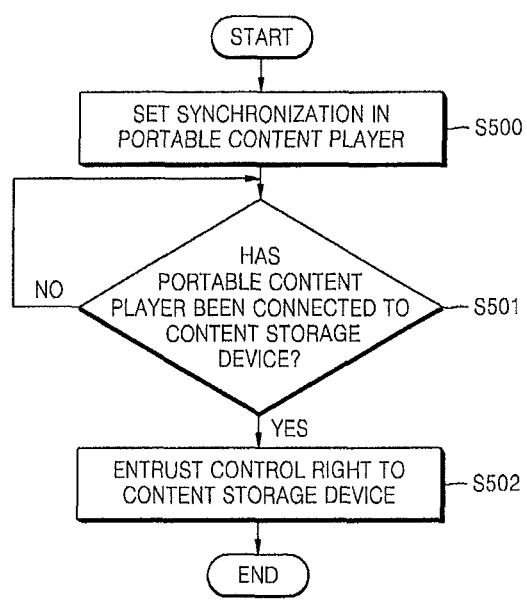
FIG. 5 is a flowchart illustrating a synchronization method of a portable content player according to an embodiment of the present invention.

FIG. 5 is a flowchart illustrating a synchronization method performed by the portable content player 110 illustrated in FIG. 1, according to an embodiment of the present invention. Referring to FIG. 5, the portable content player 110 sets or initiates synchronization in operation S500. The portable content player 110 determines in operation S501 whether the portable content player 110 is connected to the content storage device 100. In operation S502, the content storage device 100 performs content management of the portable content player 110 if the portable content player 110 is connected to the content storage device 100 in operation S501. That is, the portable content player 110 allows or transmits control rights to the content storage device 100 to control the portable content player 110. Thus, the content storage device 100 can freely update or delete a content state list and content stored in the portable content player 110. However, it is understood that according to other aspects, the portable content player 110 may perform content management of the content storage device 100.

Figure 6:
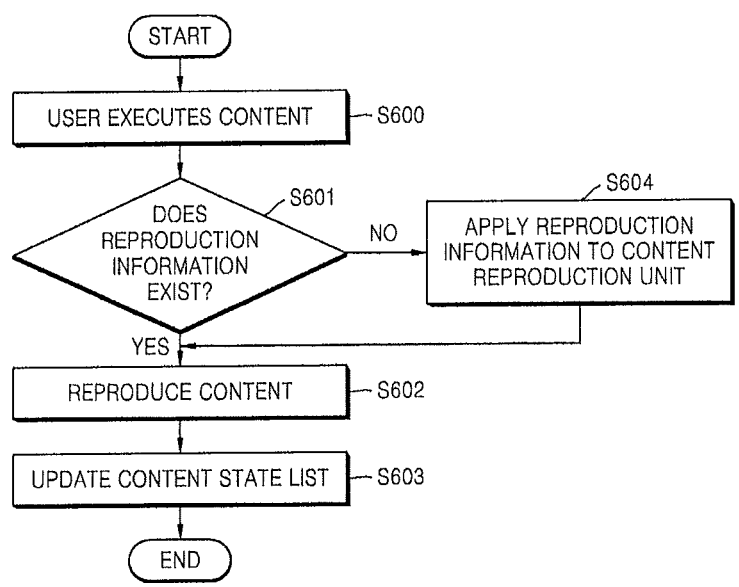
FIG. 6 is a flowchart illustrating a method of reproducing content based on reproduction information in a portable content player according to an embodiment of the present invention.

FIG. 6 is a flowchart illustrating a method of reproducing content based on reproduction information in the portable content player 110 illustrated in FIG. 1, according to an embodiment of the present invention. Referring to FIG. 6, a user executes content that has not been completely reproduced in the portable content player 110 in operation S600. The content reproduction unit 113 determines in operation S601 whether reproduction information exists. If reproduction information exists in operation S601, the content reproduction unit 113 applies the reproduction information in operation S604 in order to reproduce the content and reproduces the content based on the reproduction information in operation S602. Thus, the portable content player 110 can reproduce the content starting from a point that has not previously been reproduced. If it is determined in operation S601 that reproduction information does not exist, the content reproduction unit 113 reproduces the content from the beginning of the content in operation S602. The reproduction information may be stored in a content state list of the portable content player 110.

The portable content player 110 updates the content state list thereof with respect to the reproduced content in operation S603. That is, if the content is completely reproduced, or if reproduction of the content is interrupted, the reproduction information of the content is updated.

Figure 7:
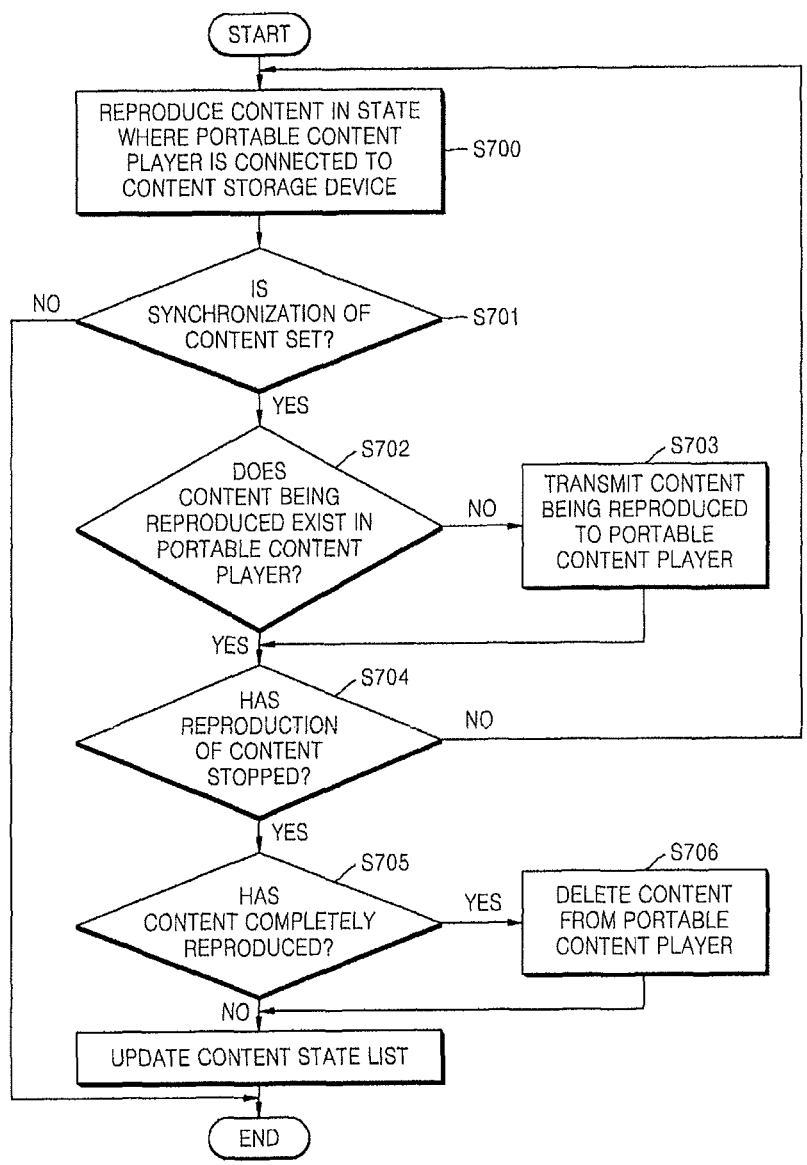
FIG. 7 is a flowchart illustrating a case where content is completely reproduced in a state where a portable content player is connected to a content storage device according to an embodiment of the present invention.

FIG. 7 is a flowchart illustrating a case where content is completely reproduced in a state where the portable content player 110 illustrated in FIG. 1 is connected to the content storage device 100 illustrated in FIG. 1, according to an embodiment of the present invention. Referring to FIG. 7, a user reproduces content in the content storage device 100 in operation S700 while the portable content player 110 is connected to the content storage device 100.

If synchronization of the content being reproduced is set in operation S701, it is determined in operation S702 whether the content being reproduced is stored in the portable content player 110.

If the content being reproduced is not stored in the portable content player 110 in operation S702, the content storage device 100 transmits the content being reproduced to the portable content player 110 in operation S703.

If the content being reproduced is stored in the portable content player 110 in operation S702, it is determined in operation S704 whether the reproduction of the content has been stopped by the user.

If the reproduction of the content has been stopped by the user in operation S704, it is determined in operation S705 whether the content has been completely reproduced. If the content has been completely reproduced in operation S705, the portable content player 110 deletes the content in operation S706, and updates a content state list thereof in operation S707. However, it is understood that according to other aspects, the content that has already been completely reproduced may just be omitted from the execution list, rather than deleted.

If the content has not been completely reproduced in operation S705, the portable content player 110 updates the content state list thereof with respect to the reproduction-interrupted content in operation S707, and the content state list of the portable content player 110 may include reproduction information of the reproduction-interrupted content. Thus, thereafter, the user can reproduce the portion that has not been reproduced based on the reproduction information in the portable content player 110 as illustrated in FIG. 6. In this case, the user may delete only the portion of the content that has been reproduced when updating the content state list of the portable content player 110.

As described above, according to aspects of the present invention, content state lists can be automatically synchronized by connecting a portable content player to a content storage device. In addition, for content that has not been completely reproduced in the content storage device, a user can, conveniently, view the content from a point that has not previously been reproduced in the portable content player.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method of synchronizing content state between a first device and a second device, the method comprising:
   determining whether the first device and the second device are connected to each other;
   selecting content according to a synchronization command included in an execution list;
   synchronizing a first content state list of the first device and a second content state list of the second device with respect to the selected content;
   determining whether a first content state of the first content state list for the selected content stored in the first device matches a second content state of the second content state list for the selected content stored in the second device when the first device and the second device are determined as being connected to each other; and
   receiving, using the first device, at least a portion of the selected content being reproduced in the second device from the second device based on a result of the matching by executing the synchronization command; and
   updating the first content state to synchronize the first content state and the second content state based on the result of the matching.

2. The method as claimed in claim 1, wherein the first content state comprises a reproduction state for the selected content stored in the first device and the second content state comprises a reproduction state for the selected content stored in the second device.

3. The method as claimed in claim 2, wherein the reproduction state is one of a completely-reproduced state, a not-completely-reproduced state and a not-reproduced state.

4. The method as claimed in claim 3, wherein at least one of the first device and the second device has information on a reproduction-interruption point for the selected content that has not been completely reproduced.

5. The method as claimed in claim 4, wherein at least one of the first device and the second device finds the reproduction-interruption point for the selected content and reproduces the selected content from a portion subsequent to the reproduction-interruption point of the content.

6. A content storage device having a content reproduction function and performing content synchronization with a portable content player, the content storage device comprising:
 a content storage unit configured to store content;
 a synchronization controller configured to
  determine whether the content storage device and the portable content player are connected,
  select content according to a synchronization command included in an execution list;
  synchronize a first content state list of the content storage device and a second content state list of the portable content player with respect to the selected content;
  determine whether a first content state of the first content state list for the selected content stored in the content storage device matches a second content state of the second content state list for the selected content stored in the portable content player when the portable content player has been determined to be connected to the content storage device, and
  update the first content state to synchronize the first content state and the second content state based on a result of the matching; and
 a connection unit configured to transmit at least a portion of the selected content being reproduced in the content storage device to the portable content player based on the result of the matching by executing the synchronization command.

7. The content storage device as claimed in claim 6, wherein the first content state comprises a reproduction state for the selected content stored in the content storage device and the second content state comprises a reproduction state for the selected content stored in the portable content player.

8. The content storage device as claimed in claim 7, wherein the reproduction state is one of a completely-reproduced state, a not-completely-reproduced state and a not-reproduced state.

9. The content storage device as claimed in claim 8, wherein at least one of the content storage device and the portable content player has information on a reproduction-interruption point for the selected content that has not been completely reproduced.

10. The content storage device as claimed in claim 9, wherein at least one of the content storage device and the portable content player finds the reproduction-interruption point for the selected content and reproduces the selected content from a portion subsequent to the reproduction-interruption point of the selected content.

11. The content storage device as claimed in claim 6, wherein the content storage device is a personal computer.

12. A portable content player having a content reproduction function and performing content synchronization with a content storage device, the portable content player comprising:
 a content storage unit configured to store content;
 synchronization controller configured to determine whether the portable content player and the content storage device are connected to each other, to select content according to a synchronization command included in an execution list, to synchronize a first content state list of the content storage device and a second content state list of the portable content player with respect to the selected content, to determine whether a first content state of the first content state list for the selected content stored in the content storage device and a second content state of the second content state list for the selected content stored in the portable content player match each other when the portable content player and the content storage device are determined as being connected to each other, and to update the second content state to synchronize the first content state and the second content state based on a result of the matching by executing the synchronization command; and
 a connection unit configured to receive at least a portion of the selected content being reproduced in the content storage device from the content storage device based on the result of the matching.

13. The portable content player as claimed in claim 12, wherein the first content state comprises a reproduction state for the selected content stored in the content storage device and the second content state comprises a reproduction state for the selected content stored in the portable content player.

14. The portable content player as claimed in claim 13, wherein the reproduction state is one of a completely-reproduced state, a not-completely-reproduced state and a not-reproduced state.

15. The portable content player as claimed in claim 14, wherein at least one of the content storage device and the portable content player has information on a reproduction-interruption point for the selected content that has not been completely reproduced.

16. The portable content player as claimed in claim 15, wherein at least one of the content storage device and the portable content player device finds the reproduction-interruption point for the selected content and reproduces the selected content from a portion subsequent to the reproduction-interruption point of the selected content.

* * * * *